Oct. 6, 1931.　　　J. B. SCHULTZ　　　1,826,484
SHUTTLE PICKER
Filed May 20, 1929

Inventor:
Johann Berthold Schultz
by
Attorney

Patented Oct. 6, 1931

1,826,484

UNITED STATES PATENT OFFICE

JOHANN BERTHOLD SCHULTZ, OF GLAUCHAU, GERMANY

SHUTTLE PICKER

Application filed May 20, 1929, Serial No. 364,474, and in Germany May 30, 1928.

This invention relates to a metallic shuttle picker which is guided in ball bearings upon the driving spindle.

According to this invention spring-actuated and exchangeable beating nipples are arranged at the lower part of the picker on both sides thereof, said nipples being adjustable vertically, as well as horizontally by means of threaded spindles. Owing to this arrangement and combination of parts it is made possible to re-adjust the point of time of the actuation of the shuttle, and as the parts chiefly concerned are exchangeable also continual service is rendered possible.

Figure 1:
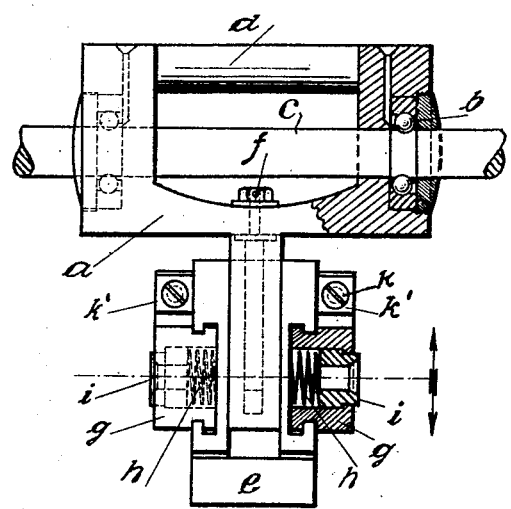
Figure 3:
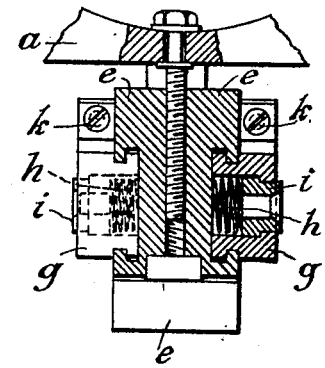
Figure 2:
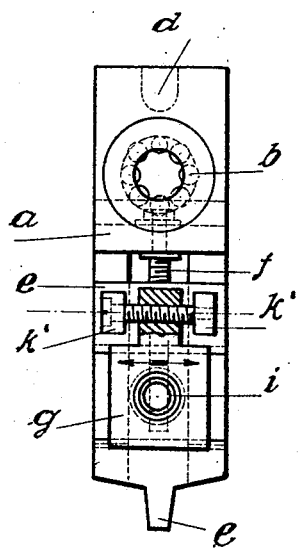

The invention is illustrated diagrammatically and by way of example on the accompanying drawings, on which Figure 1 is a side-view of a shuttle picker designed according to this invention, Figure 2 is a front-view thereof, and Figure 3 is a sectional view through the guide member and parts associated with it.

The shuttle picker which preferably is made of metal consists, first, the upper part or head $a$ which is guided in ball bearings $b$ upon the driving spindle $c$. Said part $a$ is mounted adjustably by means of the threaded spindle $f$ upon a buffer head $e$ which is provided at each side with a buffer $i$ which is elastically backed by helical springs $h$ and located exchangeably in carrier blocks $g$, each movable laterally by means of a screw $k$ mounted in bearing supports $k'$ for accurate adjustment with respect to the line of travel of the shuttle tip. The buffers may also be adjusted vertically with respect to the line of travel of the shutter tip by adjusting member $e$, by means of the spindle $f$.

I claim:

1. A shuttle picker comprising a head, a spindle journaled therein, a guide member arranged below and mounted on the head a carrier member mounted on the guide member, means for vertically adjusting said carrier member, a laterally adjustable yielding buffer mounted upon the carrier member at each side thereof, and means for laterally adjusting each buffer.

2. A shuttle picker comprising a head, a spindle journaled in the head, a guide member arranged below and mounted on the head, a carrier member mounted on the guide member, means connecting the head and carrier member and operative for vertically adjusting the latter on the carrier member, carrier blocks laterally adjustable at the carrier member upon each side thereof, means for adjusting said blocks, and a yielding buffer mounted on each carrier block and adjustable therewith.

3. A shuttle picker comprising a head, ball-bearings on the head, a spindle journaled in said bearings, a guide member mounted on the head a carrier member mounted on the guide member, means for vertically adjusting said carrier member on said guide member, a carrier block mounted at each side of the guide member and slidably adjustable laterally thereof, means for adjusting each block, and a spring-backed buffer carried by each carrier block and adjustable therewith.

In testimony whereof I affix my signature.

JOHANN BERTHOLD SCHULTZ.